Figure 1:
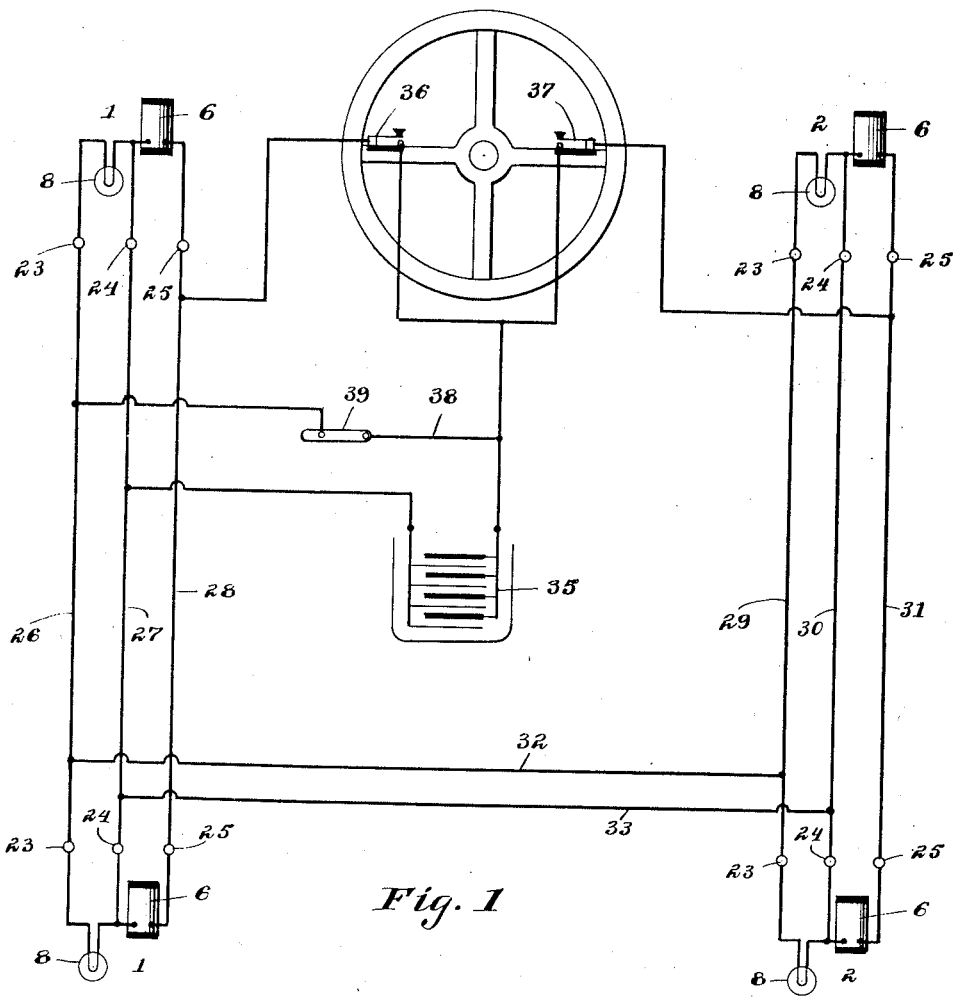

W. J. GARVEY.
DIRECTION INDICATING APPARATUS FOR MOTOR VEHICLES.
APPLICATION FILED NOV. 15, 1915.

1,192,885. Patented Aug. 1, 1916.
2 SHEETS—SHEET 1.

Witnesses
C. F. Rudolph
John J. McCarthy

Inventor
William J. Garvey,
By Victor J. Evans
Attorney

W. J. GARVEY.
DIRECTION INDICATING APPARATUS FOR MOTOR VEHICLES.
APPLICATION FILED NOV. 15, 1915.
1,192,885.
Patented Aug. 1, 1916.
2 SHEETS—SHEET 2.
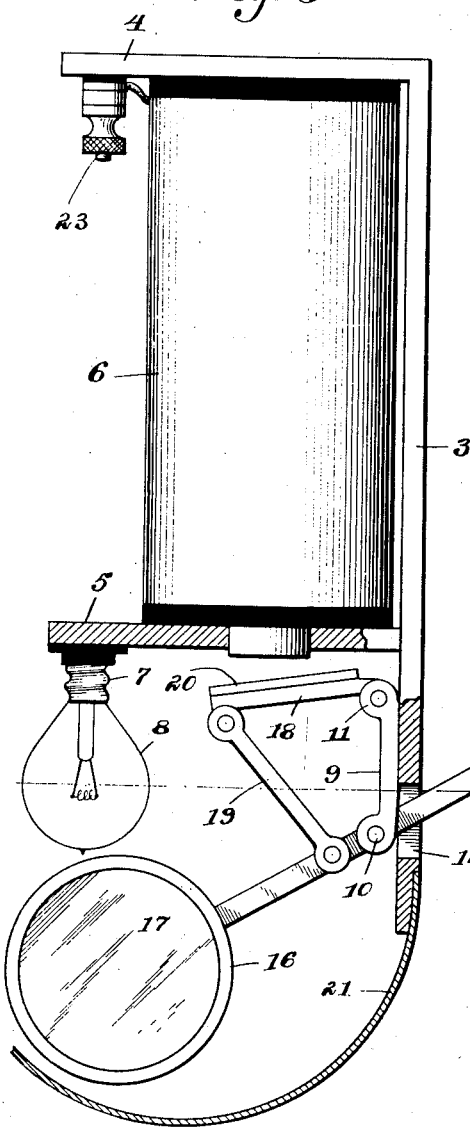
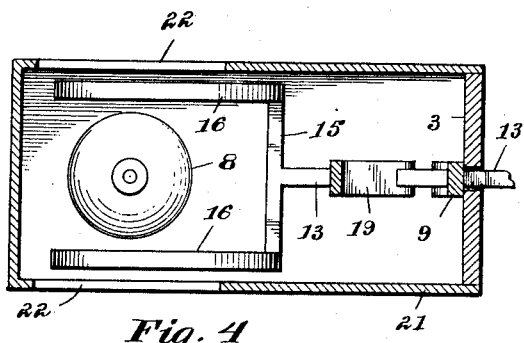
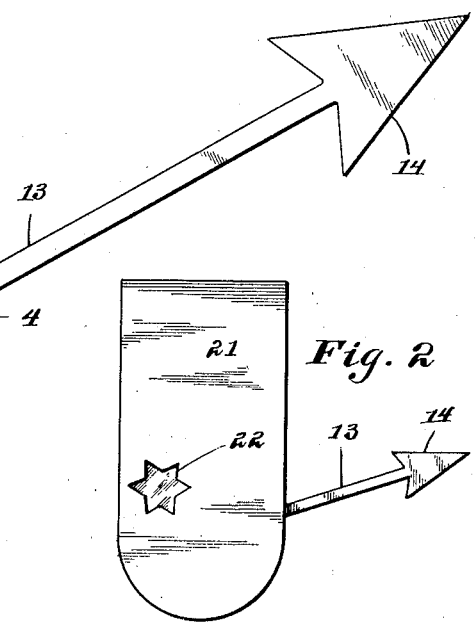
Inventor
William J. Garvey,
By Victor J. Evans
Attorney
Witnesses
C. F. Rudolph
John J. McCarty

UNITED STATES PATENT OFFICE.

WILLIAM J. GARVEY, OF BUFFALO, NEW YORK.

DIRECTION-INDICATING APPARATUS FOR MOTOR-VEHICLES.

1,192,885.   Specification of Letters Patent.   Patented Aug. 1, 1916.

Application filed November 15, 1915. Serial No. 61,633.

*To all whom it may concern:*

Be it known that I, WILLIAM J. GARVEY, a citizen of the United States, residing at Buffalo, in the county of Erie and State of New York, have invented new and useful Improvements in Direction-Indicating Apparatus for Motor-Vehicles, of which the following is a specification.

This invention relates to improvements in direction indicating apparatus for motor vehicles.

In carrying out the present invention, it is my purpose to provide apparatus of the class described whereby the driver of the vehicle may notify pedestrians and the drivers of other vehicles both at the front and rear of his vehicle of the direction in which he is about to turn his vehicle so that such pedestrians and drivers of other vehicles may control themselves accordingly.

It is also my purpose to provide direction indicating apparatus for motor vehicles which will operate efficiently and effectively under all conditions, which will be under the complete control of the driver of the machine, and which will embody comparatively few parts and these so correlated and arranged as to reduce the possibility of derangement to a minimum.

With the above and other objects in view, the invention consists in the construction, combination and arrangement of parts hereinafter set forth in and falling within the scope of the claims.

In the accompanying drawings; Figure 1 is a diagrammatic view of direction indicating apparatus constructed in accordance with my present invention. Fig. 2 is a view in side elevation of one of the indicators; Fig. 3 is a vertical sectional view through the indicator; Fig. 4 is a transverse sectional view therethrough.

Referring now to the drawings in detail, 1, 1 designate indicating devices disposed at one side of the motor vehicle, while 2, 2 indicate similar devices arranged at the opposite side of the vehicle.

The devices 1, 1 may be carried by the front and rear fenders respectively of the vehicle at one side thereof, while the devices 2, 2 may be carried by the corresponding fenders at the other side. It will be understood, however, that the indicating devices may be located in any desired positions. Each indicating device embodies a vertical support 3 having the lower end suitably secured to the particular fender. Secured to the support 3 adjacent to the upper end thereof and projecting outwardly therefrom is a horizontal shelf 4 and disposed below the shelf 4 and secured to the support 3 is a shelf 5 and disposed between the shelves 4 and 5 and suitably fastened thereto is an electromagnet 6 having the pole thereof projecting through an opening in the lower shelf 5. Fastened to the lower shelf 5 adjacent to the outer end thereof and depending therefrom is an electric lamp receptacle 7 carrying an incandescent lamp 8. Secured to the outer side of the support 3 below the lower shelf 5 and disposed at a point approximately centrally of the width of such support is a vertical bar 9 having the lower end formed with pivot lugs 10 suitably spaced apart and the upper end formed with pivot lugs 11 spaced apart. The lower lugs 10 aline with a slot 12 formed in the adjacent portion of the support 3 and pivoted between these lugs 10 and projecting through the slot 12 is a signal arm 13 having the outer end equipped with an arrow head 14, while secured to the inner end of the signal arm and arranged transversely thereof is a cross arm 15. Fastened to the respective extremities of the cross arm 15 are annuli 16 carrying lenses 17 arranged at opposite sides of the incandescent lamp 8 and adapted to lie below such lamp when the signal arm 13 is in elevated or inactive position and to be disposed in line with the lamp when the signal arm is in horizontal or signaling position. Pivoted between the lugs 11 on the upper end of the bar 9 is one end of a link 18, while connecting the remaining end of the link 18 with the inner end of the signal arm 13 is a connecting rod 19. Secured to the link 18 is an armature 20 disposed within the influence of the pole of the electromagnet 6.

In the present instance, the support 3 carrying the magnet, the lamp and the signal arm, is inclosed in a casing 21, the support 3 forming one edge wall of such casing, and formed in the side walls of the casing 21 in line with the lamp 8 are openings 22 through which the rays of light from the lamp may be projected when the lamp is illuminated.

Normally, the magnets 6 of the respective signaling devices and the lamps 8 are deenergized and in this condition of the magnets, the outer ends of the signal arms 13 are elevated and the annuli carrying the lenses lowered. When, however, the magnets are energized, the armatures 20 are drawn upwardly, thereby swinging the signal arms to horizontal or signaling position and moving the lenses across the openings 22 in the casing and into registration with the lamps, motion being transmitted from the armatures through the connecting rods 19 to the signal arms. When the lamps are energized, the lenses, which are preferably colored red, are visible through the sight openings 22 so that the devices may be visible at night.

Suitably secured to the top shelf 4 are binding posts 23, 24 and 25 and one terminal of the lamp 8 is connected to the binding post 23, while the remaining terminal is connected to the binding post 24. One terminal of the magnet 6 is connected to the binding post 25 and the remaining terminal of such magnet is secured to the binding post 24. The binding posts 23 of the indicating devices 1 are connected to each other by means of a conductor 26, while the binding posts 24 of such devices are connected to each other by means of a conductor 27 and the binding posts 25 by means of a conductor 28. The binding posts 23, 24 and 25 of one device 2 are connected with the corresponding binding posts of the other device 2 by means of conductors 29, 30 and 31 respectively. The conductor 29 is connected to the conductor 26 by means of a conductor 32 and the conductor 30 is connected through the conductor 27 by means of a conductor 33.

35 designates a suitable source of electrical energy such, for instance, as a storage battery and one terminal of the storage battery is connected to the conductor 27, while the remaining terminal is connected with push buttons 36 and 37 mounted upon the steering wheel of the motor vehicle. The remaining binding posts of the push buttons 36 and 37 are connected with the conductors 28 and 31 respectively. The terminal of the storage battery 35 connected with the push buttons 36 and 37 is also connected with the conductor 26 by means of a conductor 38 and located in the conductor 38 is a manually operable switch 39. By means of these circuit connections, it will be seen that the electromagnets of the indicating devices 1 are under the control of the push button switch 36, while the magnets of the devices 2 are under the control of the push button 37, the lamps of all of the indicating devices being under the control of the switch 39.

In the present instance, when the operator of the vehicle is about to turn his vehicle to the left, he closes the circuit of the push button 36 with the effect to energize the magnets of the indicating devices 1 to swing the signal arms to signaling position, while when such operator is about to turn his vehicle to the right, he depresses the push button 37 and energizes the magnets of the signaling devices 2. At night, the switch 39 may be closed so as to energize all of the lamps.

When the push button 36 is actuated to circuit closing position, current flows from one side of the battery 35, through said push button, through the conductor 28, binding posts 25 and magnets 6 of the signaling devices 1, and then back to the other side of the battery by way of the binding posts 24 and conductor 27. Upon the closing of the push button 37, current flows from one side of the battery 35, through said push button, the conductor 31, the binding posts 25 and the magnets 6 of the devices 2, and then back to the other side of the battery by way of the binding posts 24, conductors 30, 33 and 27. Upon the closing of the switch 39, current flows from one side of the battery 35, through the conductor 38, the conductor 26, through the lamp 8 of the devices 1, and back to the other side of the battery by way of the binding posts 24 and the conductor 27. The current flowing through the conductor 26, branches and flows through the conductor 32 and the conductor 29, through the binding posts 23, and the lamps 8 of the devices 2, and then back to the conductor 27 by way of the conductors 30 and 33.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. An indicating device of the class described comprising a vertical support having a slot formed therein adjacent to the lower end thereof, a magnet mounted upon one side of said support, a bar secured to said support adjacent to said slot, a signal arm projecting through said slot and pivoted to said bar, a link having one end pivoted to said bar, a connecting rod connecting the other end of said link to said signal arm, an armature on said link disposed within the influence of the pole of said magnet whereby the signal arm may be swung to signaling position upon the energization of the magnet, and shelves secured to said support and holding said magnet in position.

2. An indicating device of the class described comprising a vertical support having a slot formed therein adjacent to the lower end thereof, a magnet mounted upon one side of said support, a bar secured to said support adjacent to said slot, a signal arm projecting through said slot and pivoted to said bar, a link having one end pivoted to said bar, a connecting rod connecting the other end of said link to said signal arm, an armature on said link disposed within the influence of the pole of said magnet whereby the signal arm may be swung to signaling position upon the energization of the magnet, a cross arm secured to said signal arm, annuli on the outer ends of said cross arm, lenses carried by said annuli respectively, and a lamp disposed at the limit of the path of movement of said signal arm under the action of said magnet whereby said lenses will be brought into line with said lamp in the movement of the signal arm.

In testimony whereof I affix my signature in presence of two witnesses.

WILLIAM J. GARVEY.

Witnesses:
  Mrs. L. K. ARNDT,
  ALBERT L. ARNDT.